United States Patent
Yun et al.

(10) Patent No.: US 12,545,093 B2
(45) Date of Patent: Feb. 10, 2026

(54) HYDRO-MOUNT

(71) Applicants: HYUNDAI MOTOR COMPANY, Seoul (KR); KIA CORPORATION, Seoul (KR)

(72) Inventors: Jae Hyung Yun, Hwaseong-si (KR); Jang Ho Kim, Yongin-si (KR); Hyo Seok Kim, Gwangmyeong-si (KR); Gu Gyun Kwon, Incheon (KR); Sang Hoon Han, Hwaseong-si (KR); Seung Won Kim, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 1178 days.

(21) Appl. No.: 17/480,755

(22) Filed: Sep. 21, 2021

(65) Prior Publication Data

US 2022/0153115 A1    May 19, 2022

(30) Foreign Application Priority Data

Nov. 16, 2020   (KR) .................. 10-2020-0152903

(51) Int. Cl.
 *B60K 5/12*    (2006.01)
 *B60K 5/10*    (2006.01)
 *F16F 13/10*   (2006.01)

(52) U.S. Cl.
 CPC .......... *B60K 5/1208* (2013.01); *F16F 13/103* (2013.01); *F16F 2226/04* (2013.01)

(58) Field of Classification Search
 CPC .. F16F 13/103; F16F 2226/04; F16F 13/1445; F16F 2226/041; B60K 5/1208; B60K 5/12; B60K 5/10
 See application file for complete search history.

(56) References Cited

U.S. PATENT DOCUMENTS

| | | | | |
|---|---|---|---|---|
| 2,321,715 A * | 6/1943 | Wahlberg | ............. | B60K 5/1208 248/596 |
| 5,340,093 A * | 8/1994 | Rudolph | ............... | F16F 13/106 267/140.13 |
| 8,308,148 B2 * | 11/2012 | Shand | .................... | B62D 24/02 267/141.1 |
| 10,618,397 B2 * | 4/2020 | Kim | .................... | B60K 5/1283 |
| 10,619,697 B2 * | 4/2020 | Han | ..................... | F16F 13/107 |
| 2003/0030202 A1 * | 2/2003 | Thomazeau | .......... | F16F 13/105 267/140.13 |
| 2003/0038414 A1 * | 2/2003 | Pizanti | .................. | F16F 13/103 267/140.13 |
| 2003/0047855 A1 * | 3/2003 | Takashima | ............ | F16F 13/264 267/140.11 |

(Continued)

FOREIGN PATENT DOCUMENTS

KR   10-2019-0023751 A   3/2019
KR   10-2019-0060301 A   6/2019

*Primary Examiner* — Robert A. Siconolfi
*Assistant Examiner* — James K Hsiao
(74) *Attorney, Agent, or Firm* — Morgan Lewis & Bockius LLP (57) ABSTRACT

A hydro engine mount for a vehicle may include a locking body including a plurality of locking portions; a body plate including a plurality of fastening grooves configured to be fastened to the plurality of locking portions, wherein a main rubber is mounted in the body plate; and a diaphragm stacked between the main rubber and the locking body.

19 Claims, 12 Drawing Sheets

(56) References Cited

U.S. PATENT DOCUMENTS

| | | | | |
|---|---|---|---|---|
| 2004/0212133 | A1* | 10/2004 | Thomazeau | F16F 13/106 |
| | | | | 267/140.13 |
| 2005/0206056 | A1* | 9/2005 | Maeno | F16F 13/106 |
| | | | | 267/141 |
| 2006/0006593 | A1* | 1/2006 | Bretaudeau | F16F 13/268 |
| | | | | 267/140.14 |
| 2006/0261531 | A1* | 11/2006 | Kim | F16F 13/16 |
| | | | | 267/140.13 |
| 2011/0133375 | A1* | 6/2011 | Hwang | F16F 13/108 |
| | | | | 267/140.13 |
| 2013/0264756 | A1* | 10/2013 | Daito | F16F 13/08 |
| | | | | 267/140.13 |
| 2014/0159292 | A1* | 6/2014 | Kim | F16F 6/00 |
| | | | | 267/140.13 |
| 2014/0175719 | A1* | 6/2014 | Kanaya | F16F 13/106 |
| | | | | 267/140.13 |
| 2015/0252866 | A1* | 9/2015 | Muraoka | F16F 13/085 |
| | | | | 267/140.13 |
| 2018/0172109 | A1* | 6/2018 | Nishi | F16F 1/3835 |
| 2019/0063542 | A1* | 2/2019 | Han | F16F 13/10 |
| 2019/0072151 | A1* | 3/2019 | Kim | F16F 13/10 |
| 2019/0160933 | A1* | 5/2019 | Kim | F16F 13/1463 |
| 2019/0366825 | A1* | 12/2019 | Kim | B60K 5/1233 |
| 2024/0123812 | A1* | 4/2024 | Praud | B60K 5/1208 |

* cited by examiner

HYDRO-MOUNT

CROSS-REFERENCE TO RELATED APPLICATION

The present application claims priority to Korean Patent Application No 10-2020-0152903, filed Nov. 16, 2020, the entire contents of which is incorporated herein for all purposes by this reference.

BACKGROUND OF THE PRESENT INVENTION

Field of the Invention

The present invention relates generally to a hydro engine mount of a vehicle, and more particularly, to an assembly structure of a hydro-mount.

Description of Related Art

An engine mount supports the load of a powertrain by connecting the powertrain of a vehicle to a vehicle body. To isolate the vehicle from vibration and noise of the powertrain and to restrain behavior thereof, the engine mount includes a rubber portion acting as an insulator therein and a stopper restraining displacement of the rubber portion.

In recent years, to improve performance required in the vehicle, such as Ride & Handling (R&H) and noise, vibration, and harshness (NVH), a hydro-mount in which a fluid is inserted into the engine mount has been widely used.

Figure 1A:
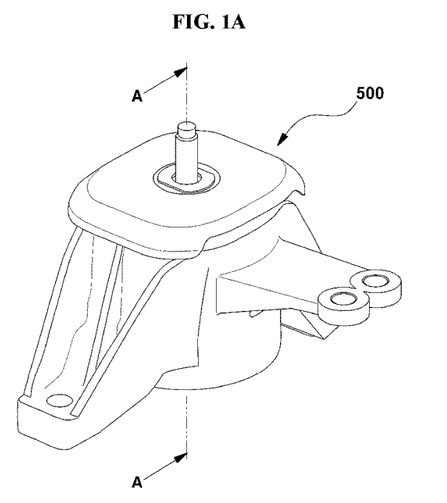
FIG. 1A is a view showing a hydro engine mount of a vehicle.
Figure 1B:
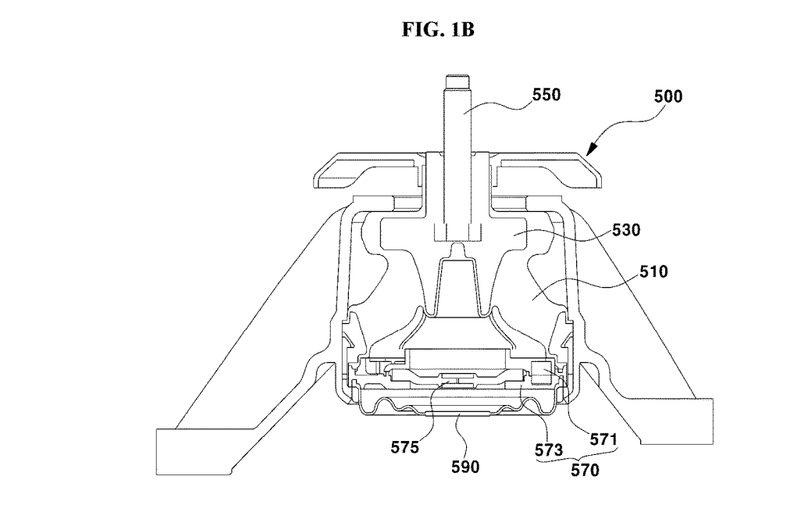
FIG. 1B is a view taken along line A-A in FIG. 1A.

As shown in FIG. 1A and FIG. 1B, a hydro-mount 500 includes a main rubber 510, a core 530 and a core bolt 550, a nozzle assembly 570, and a diaphragm 590. The core 530 and the core bolt 550 are arranged concentrically with the main rubber 510 and radially inward in the main rubber 510. The nozzle assembly 570 has an upper plate 571 and a lower plate 573 for damping by a fluid. The nozzle assembly further includes and a membrane 575 located between the upper plate 571 and the lower plate 573.

The hydro-mount 500 exhibits damping performance at a specific frequency by assembling the above internal components, and there are two main methods to assemble the hydro-mount 500.

In the former case, the nozzle assembly and the diaphragm are inserted into a pipe where the main rubber 510 is vulcanized, in a curling type. Then an end portion of the pipe is curled by physical force. In the instant case, an assembly structure thereof is stable, but its components may be damaged when the hydro-mount 500 is disassembled for a reassembling or analytical purpose.

In the latter case, the nozzle assembly and the diaphragm are stacked in a hooking type, and a hook member made of plastic or metal fixes the internal components. This case uses elastic property of the hook member, which opens during assembly and finally is recovered to an original state thereof due to its elasticity. In the instant case, since the hook member may be made of various materials, degrees of freedom are high in terms of cost and weight and reassembly and disassembly are easy.

The information included in this Background of the present invention section is only for enhancement of understanding of the general background of the present invention and may not be taken as an acknowledgement or any form of suggestion that this information forms the prior art already known to a person skilled in the art.

BRIEF SUMMARY

Various aspects of the present invention are directed to providing a hydro-mount having an improved assembly method.

The present invention is not limited to the objective mentioned above, and other objectives not mentioned are clearly understood by those who are ordinarily skilled in the art to which various exemplary embodiments of the present invention belongs from the following description.

The characteristics of the present invention to achieve the above objective of the present invention, and to perform a characteristic function of the present invention are as follows.

According to various exemplary embodiments of the present invention, the hydro-mount includes: a locking body including a plurality of locking portions; a body plate including a plurality of fastening grooves configured to be fastened to the plurality of locking portions, wherein a main rubber is mounted in the body plate; and a diaphragm stacked between the main rubber and the locking body.

The hydro-mount according to various exemplary embodiments of the present invention may include: a core; a body plate disposed concentrically with the core radially outward and including a plurality of fastening grooves spaced from each other along a circumference of the body plate; a main rubber inserted between the core and the body plate; a locking body including a plurality of locking portions being engageable with the fastening grooves; and a nozzle assembly and a diaphragm stacked in order between the main rubber and the locking body, wherein the nozzle assembly and the diaphragm include a plurality of recesses formed by depressing and spaced a certain distance apart along circumferences of the nozzle assembly and the diaphragm to move the locking portions The hydro-mount according to various exemplary embodiments of the present invention can reduce costs and weights due to the improved assembly structure.

The hydro-mount according to various exemplary embodiments of the present invention may be reassembled after disassembly owing to the improved assembly structure.

The present invention is not limited to the above-described effect, and other effects not mentioned will be recognized by those skilled in the art from the following description.

Other aspects and exemplary embodiments of the present invention are discussed infra.

The above and other features of the present invention are discussed infra.

It is understood that the term "vehicle" or "vehicular" or other similar term as used herein is inclusive of motor vehicles in general such as passenger vehicles including sports utility vehicles (SUVs), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles, e.g., fuels derived from resources other than petroleum. As referred to herein, a hybrid vehicle is a vehicle that has two or more sources of power, for example both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the basic principles of the present invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, exemplary embodiments of the present invention will be described in detail with reference to the accompanying drawings. Specific structures or functions described in the exemplary embodiments of the present invention are merely for illustrative purposes. Embodiments according to the concept of the present invention may be implemented in various forms, and it should be understood that they should not be construed as being limited to the exemplary embodiments described in the exemplary embodiment, but include all of modifications, equivalents, or substitutes included in the spirit and scope of the present invention.

It will be understood that, although the terms "first," "second," etc. may be used herein to describe various elements, these elements should not be limited by these terms. These terms are only used to distinguish one element from another element. For instance, a first element discussed below could be termed a second element without departing from the teachings of the present invention. Similarly, the second element could also be termed the first element.

It will be understood that when an element is referred to as being "coupled" or "connected" to another element, it may be directly coupled or connected to the other element or intervening elements may be present therebetween. In contrast, it should be understood that when an element is referred to as being "directly coupled" or "directly connected" to another element, there are no intervening elements present. Other expressions that explain the relationship between elements, such as "between," "directly between," "adjacent to," or "directly adjacent to," should be construed in the same way.

Like reference numerals denote like components throughout the specification. In the meantime, the terminology used herein is for describing various exemplary embodiments only and is not intended to be limiting. As used herein, the singular forms "a," "an," and "the" are intended to include the plural forms as well, unless the context clearly indicates otherwise. It will be further understood that the terms "comprise," "include," "have," etc., when used in the exemplary embodiment, specify the presence of stated components, steps, operations, and/or elements, but do not preclude the presence or addition of one or more other components, steps, operations, and/or elements thereof.

According to various exemplary embodiments of the present invention, provided is a hydro-mount including an assembly structure configured for reducing cost and weight by improving an assembly method.

Hereinafter, the present invention will be described in detail with reference to the accompanying drawings.

Figure 2A:
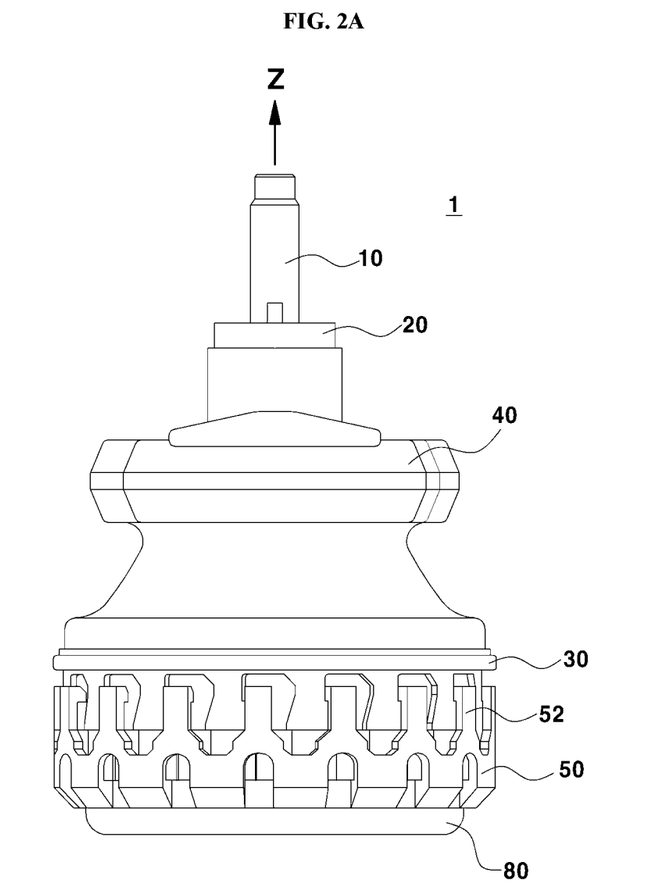
FIG. 2A is a view showing a hydro-mount according to various exemplary embodiments of the present invention.
Figure 2B:
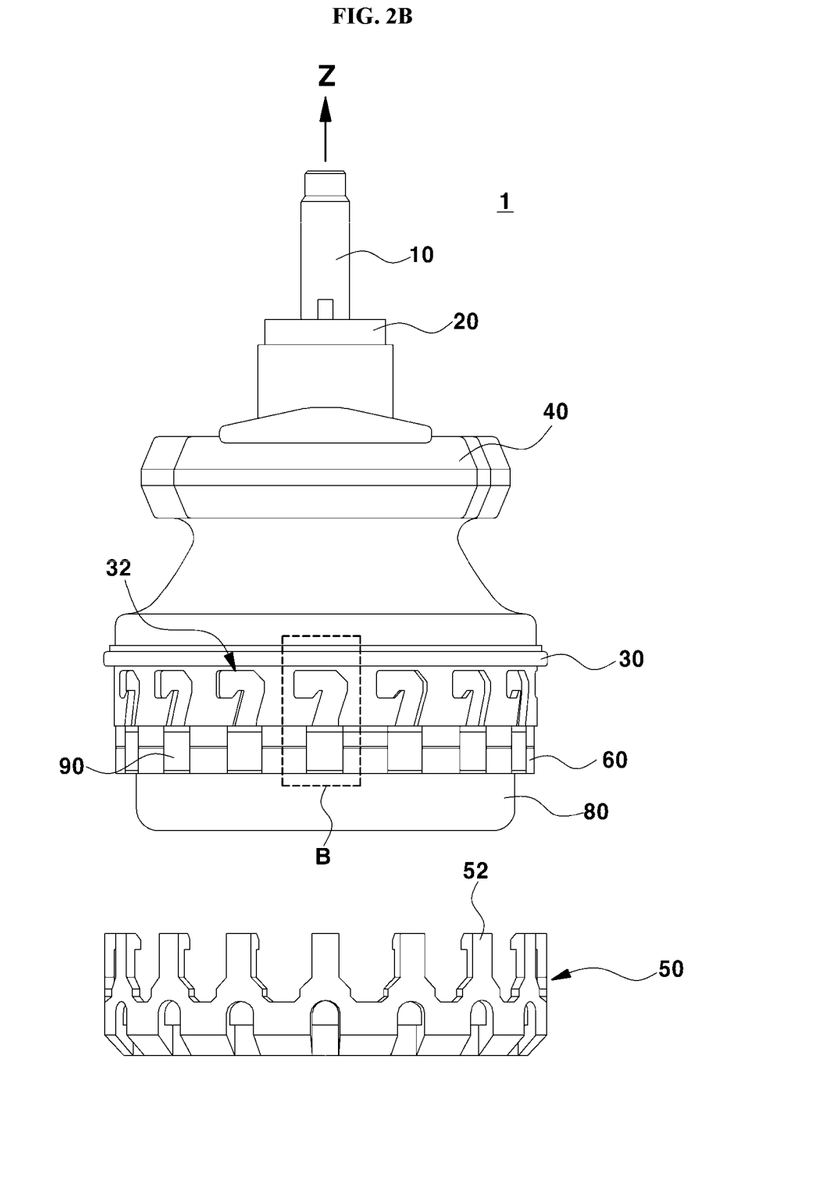
FIG. 2B is a view showing the hydro-mount according to various exemplary embodiments of the present invention, the view showing a disassembled state of the locking body.

As shown in FIG. 2A and FIG. 2B, according to various exemplary embodiments of the present invention, the hydro-mount 1 is configured to be fastened to an engine of a vehicle through a core bolt 10, and the core bolt 10 is mounted to a through hole formed in a core 20. Alternatively, the core 20 and the core bolt 10 may be a casting formed into a single body.

A body plate 30 is disposed concentrically with the core 20 radially outwardly from the core 20, and a main rubber 40 is inserted between the core 20 and the body plate 30. The main rubber 40 may be vulcanized between the core 20 and the body plate 30.

The body plate 30 includes a plurality of fastening grooves 32. According to various exemplary embodiments of the present invention, the fastening grooves 32 are provided to be spaced from each other along a circumference of the body plate 30. Each of the fastening grooves 32 may have the same form and may be disposed in the body plate 30 while being spaced from each other at preset intervals.

According to various exemplary embodiments of the present invention, the fastening groove 32 may be formed by being recessed from a surface of the body plate 30. According to various exemplary embodiments of the present invention, the fastening groove 32 may be formed by cutting out the body plate 30.

Figure 3:
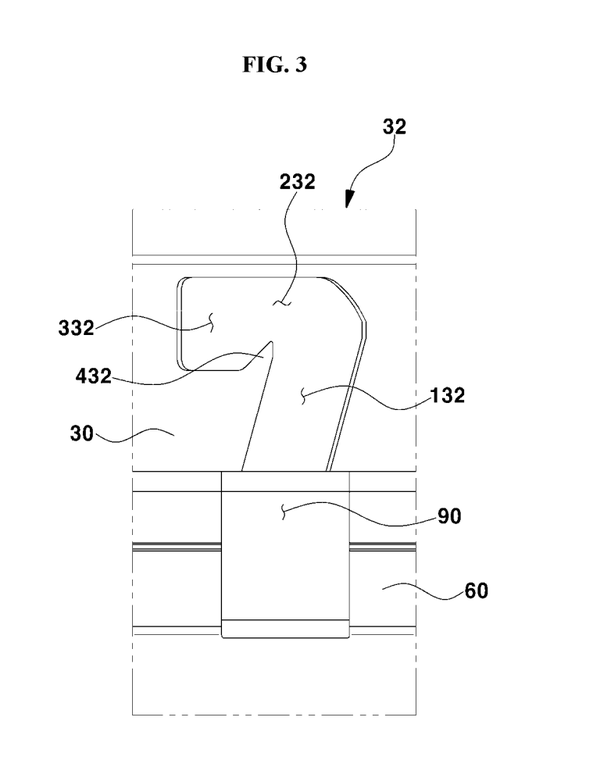
FIG. 3 is an enlarged view showing a part indicated by a dotted line in FIG. 2B.

Referring to FIG. 3, according to various exemplary embodiments of the present invention, the fastening grooves 32 includes a transfer route 132, a turn route 232, and a seating portion 332.

The transfer route 132 is a portion where a locking body 50, which will be described below, meets the body plate 30 first, and extends along an axial direction Z of the body plate 30. According to various exemplary embodiments of the present invention, the transfer route 132 may be configured to be inclined by a predetermined angle from the axial direction Z of the hydro-mount 1 or the axial direction Z of the body plate 30.

The turn route 232 extends by being bent from the transfer route 132 in the body plate 30. The turn route 232 is a portion formed by gently bending the transfer route 132 or making the transfer route 132 into a curved surface. The turn route 232 is preferably formed in a direction substantially parallel to a circumferential direction of the body plate 30 or a direction perpendicular to the axial direction Z of the hydro-mount 1.

The turn route 232 extends in the circumferential direction of the body plate 30 and expands downward, and the seating portion 332 may be provided by the portion expanding downward. As the turn route 232 expands downward, a peg 432 is provided between the seating portion 332 and the turn route 232. According to various exemplary embodiments of the present invention, the peg 432 may be formed in a sharp tip or triangular shape. According to various exemplary embodiments of the present invention, the peg 432 may be formed in a round shape. According to another exemplary embodiment of present invention, the peg 432 may be formed in a protrusion including a flat portion. The peg 432 is provided to protrude closer to the turn route 232 than the seating portion 332. In other words, the peg 432 may be formed into various shapes, and may include the above embodiments as non-limiting examples.

According to various exemplary embodiments of the present invention, the hydro-mount 1 includes the locking body 50 coupled to the body plate 30. According to various exemplary embodiments of the present invention, the locking body 50 may have an annular shape.

Figure 4:
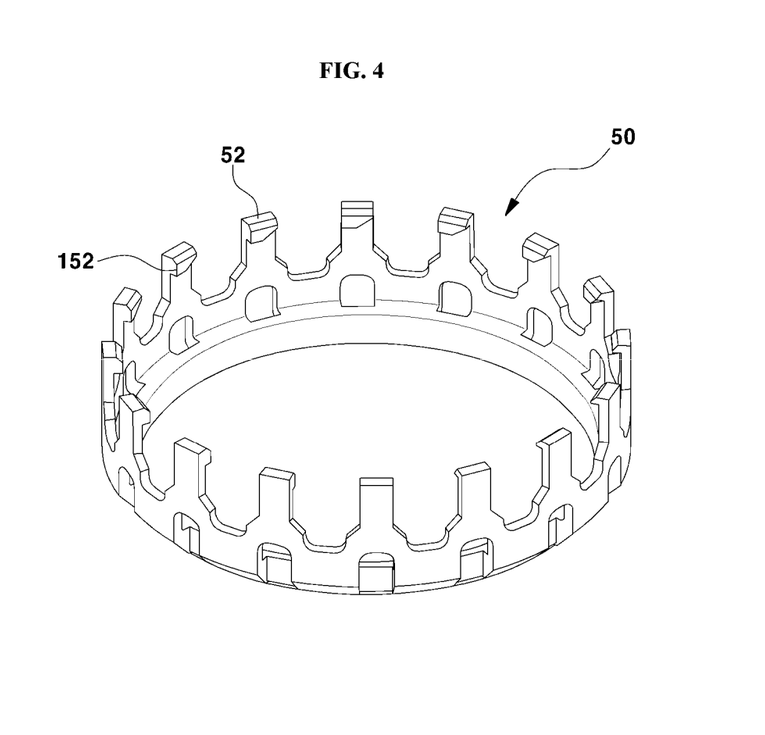
FIG. 4 is a view showing a locking body according to various exemplary embodiments of the present invention.
Figure 5:
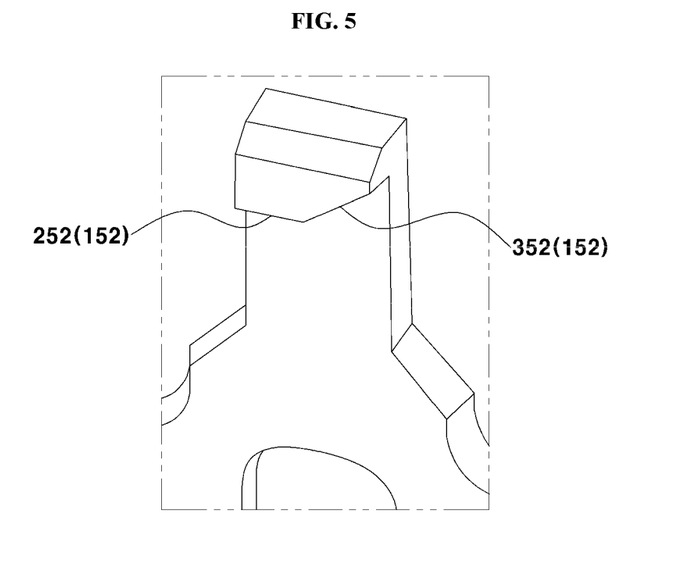
FIG. 5 is a view showing the locking body according to various exemplary embodiments of the present invention where the locking body is viewed from its center radially outward.

Referring to FIG. 4 and FIG. 5, the locking body 50 includes a plurality of locking portions 52. The locking portions 52 are configured to engage with the fastening grooves 32, and the number of the locking portions 52 and the number of the fastening grooves 32 are provided to match each other. Each of the locking portions 52 is configured to pass sequentially through the transfer route 132 and the turn route 232 and to finally engage with the seating portion 332.

According to various exemplary embodiments of the present invention, each of the locking portions 52 may be formed in a hook shape. The hook-shaped locking portion 52 may be configured to pass sequentially through the transfer route 132 and the turn route 232 and then to be hooked to the seating portion 332.

According to various exemplary embodiments of the present invention, the locking portion 52 has a protrusion 152. The protrusion 152 may be a solid protruding from the locking portion 52 instead of the hook shape. The protrusion 152 protrudes toward a center portion of the locking body 50. According to various exemplary embodiments of the present invention, the protrusion 152 protrudes toward the center portion of the locking body 50, either gently or in a semicircular shape. The protrusion 152 may have a flat portion 252 protruding substantially perpendicularly to an internal surface of the lock body 50, and the flat portion 252 extends in a direction parallel to a circumferential direction of the locking body 50 or the circumferential direction of the body plate 30. Furthermore, the protrusion 152 may include an inclination portion 352 that protrudes substantially perpendicularly from the surface of the locking body 50 and extends at a predetermined angle with respect to the flat portion 252. In case of the protrusion 152, the hook-shaped locking portion 52 is not hooked to the seating portion 332, but the flat portion 252 protruding perpendicularly from the surface of the locking body 50 may be accommodated on the seating portion 332. When the locking portion 52 moves from the turn route 232 to the seating portion 332, the inclination portion 352 is brought into contact with the peg 432 to allow the locking portion 52 to reach the seating portion 332 even with a small degree of twisting, elastic restoring force. The flat portion 252 is accommodated on a seating portion 232 to secure stability in the assembly of the hydro-mount. Meanwhile, according to various exemplary embodiments of the present invention, the hook shape and the protrusion 152 may be combined.

A nozzle assembly 60 and a diaphragm 80 are disposed or stacked in order between the body plate 30 and the locking body 50. The nozzle assembly 60 stores a fluid to enable flow of the fluid for damping and may include a membrane 70 partitioning fluid storage chambers.

According to various exemplary embodiments of the present invention, on circumferential surfaces of the nozzle assembly 60 and the diaphragm 80, a plurality of recesses 90 formed by depressing respective surfaces thereof is provided. Each of the recesses 90 provides a passage through which the locking portion 50 or the protrusion 152 may move when the locking body 50 is mounted to or disassembled from the body plate 30.

The assembly of the hydro-mount 1 according to various exemplary embodiments of the present invention is performed as follows.

Referring again to FIG. 2C, below the main rubber 40 where the body plate 30 is coupled, an upper plate 62 of the nozzle assembly 60, the membrane 70, a lower plate 64 of the nozzle assembly 60, and the diaphragm 80 are stacked and mounted in the axial direction Z, and the fluid is inserted therein.

Figure 2C:
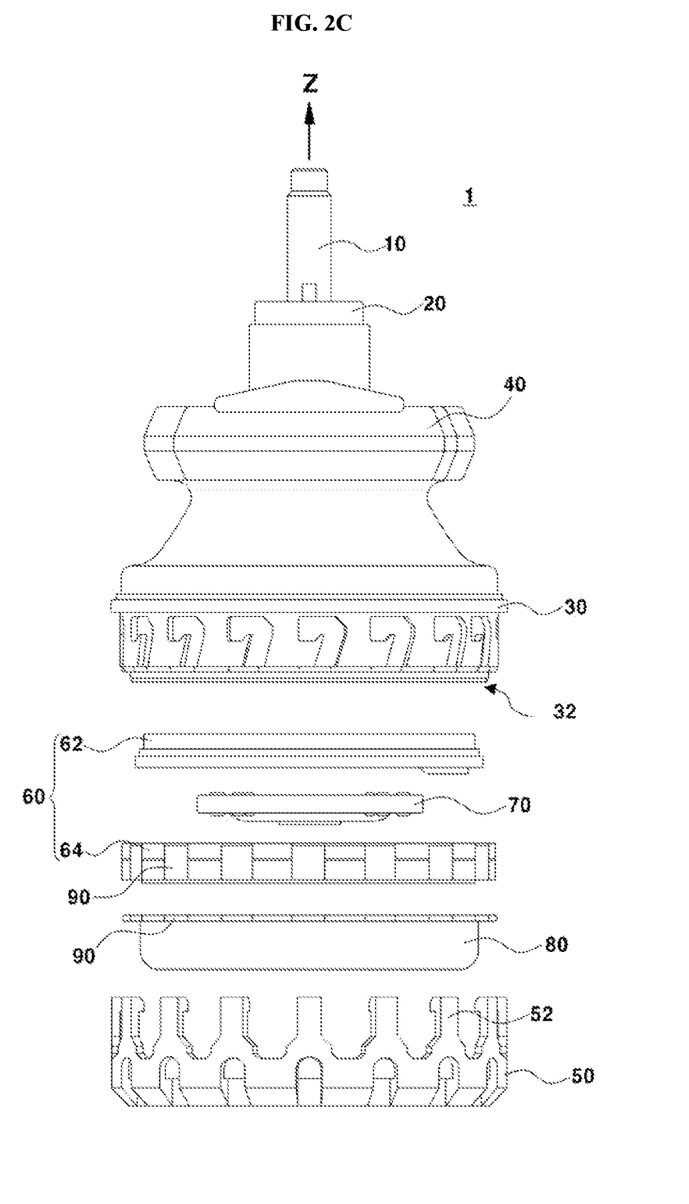
FIG. 2C is an exploded-perspective view showing the hydro-mount in FIG. 2A.

Compressive force is applied so that the locking body 50 passes through the recesses 90 and the transfer routes 132 below the diaphragm 80 and coupled to the body plate 30. At the instant time, as the main rubber 40 is compressed and the locking portions 52 align with the recesses 90, the locking portions 52 pass through the recesses 90. The compressive force may be provided from a separate assembly device, and the assembly device rotatably grips the locking body 50 by a thrust bearing or the like.

Referring again to FIG. 3, while the locking portions 52 pass through the transfer routes 132, the locking body 50 rotates slightly and the locking portions 52 is twisted. Furthermore, at least one of the compressed main rubber 40 and the diaphragm 80 is twisted, and at least one of the main rubber 40 and the diaphragm 80 may have elastic restoring force due to twisting.

Figure 6A:
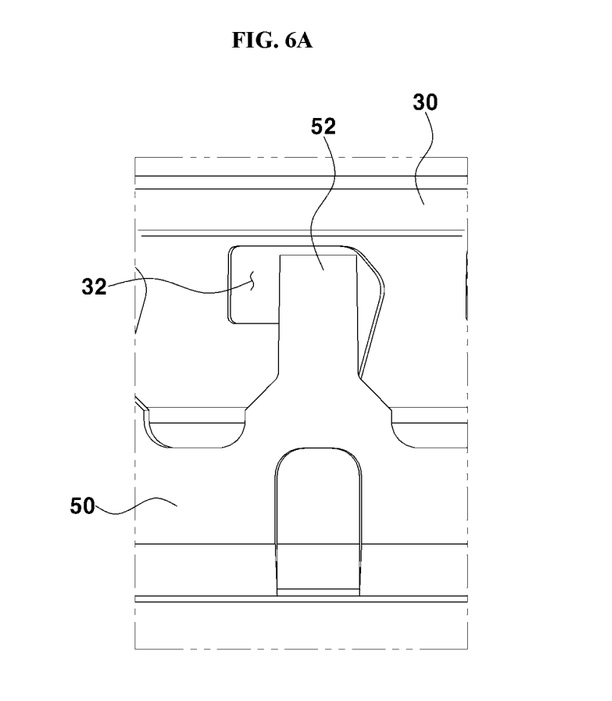
FIG. 6A and FIG. 6B shows an assembly process of the hydro-mount according to various exemplary embodiments of the present invention.
Figure 6B:
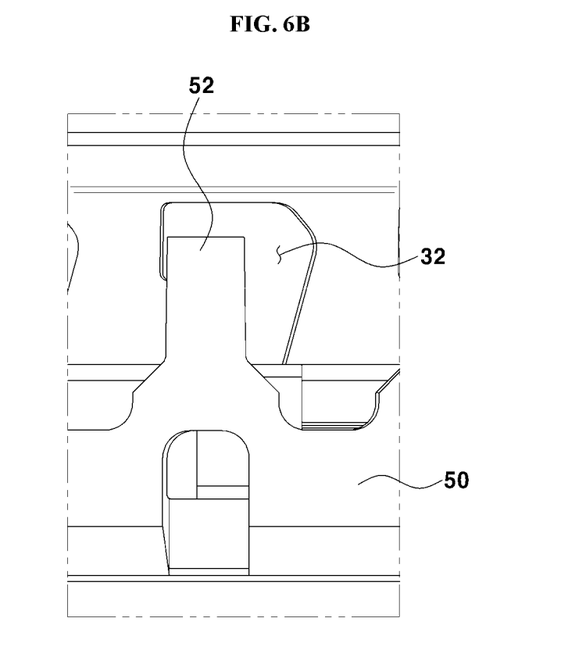
Figure 6C:
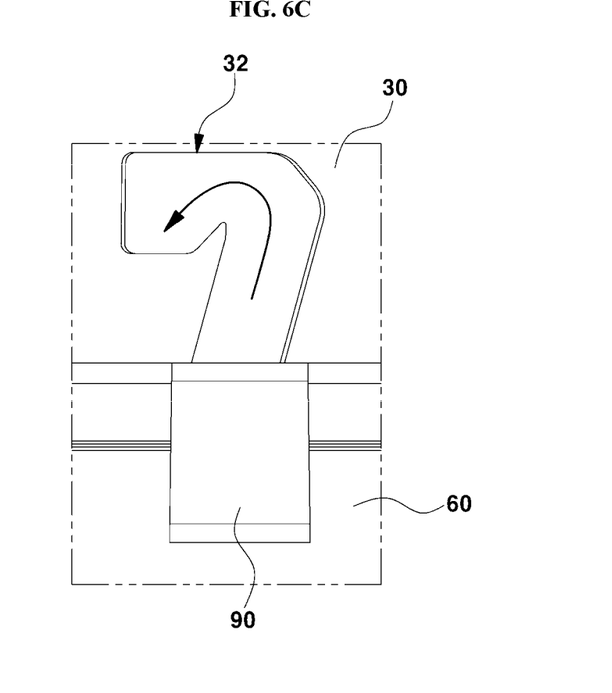
FIG. 6C depicts a route of a locking portion with respect to a fastening groove in the assembly process of the hydro-mount according to various exemplary embodiments of the present invention with an arrow.
Figure 7A:
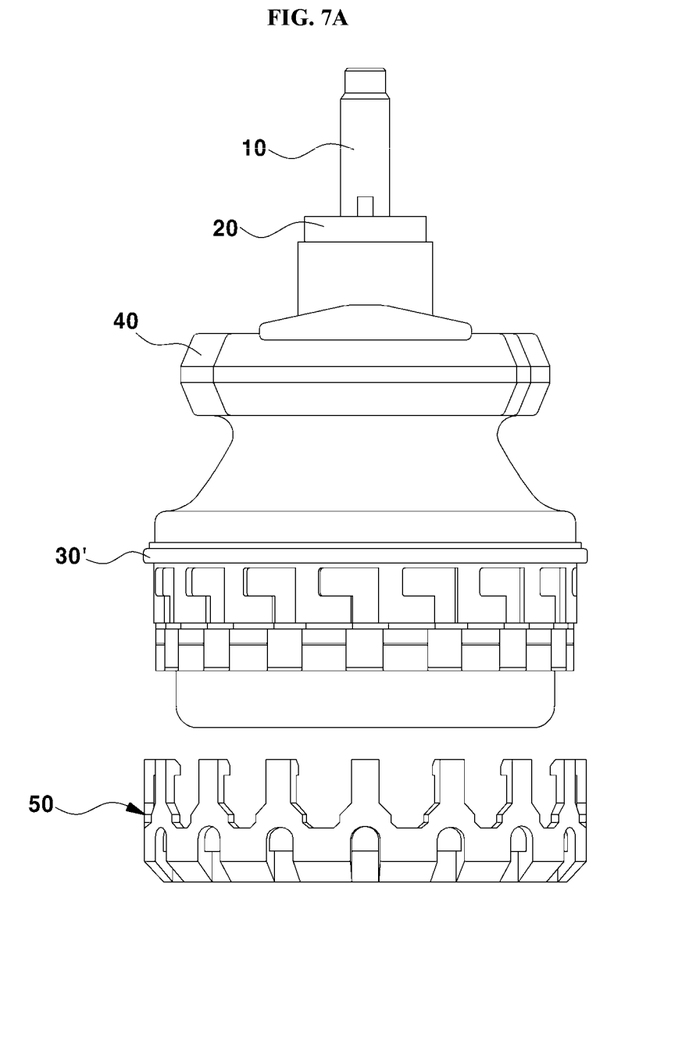
FIG. 7A is a view showing the hydro-mount according to various exemplary embodiments of the present invention, the view showing a disassembled state of the locking body.
Figure 7B:
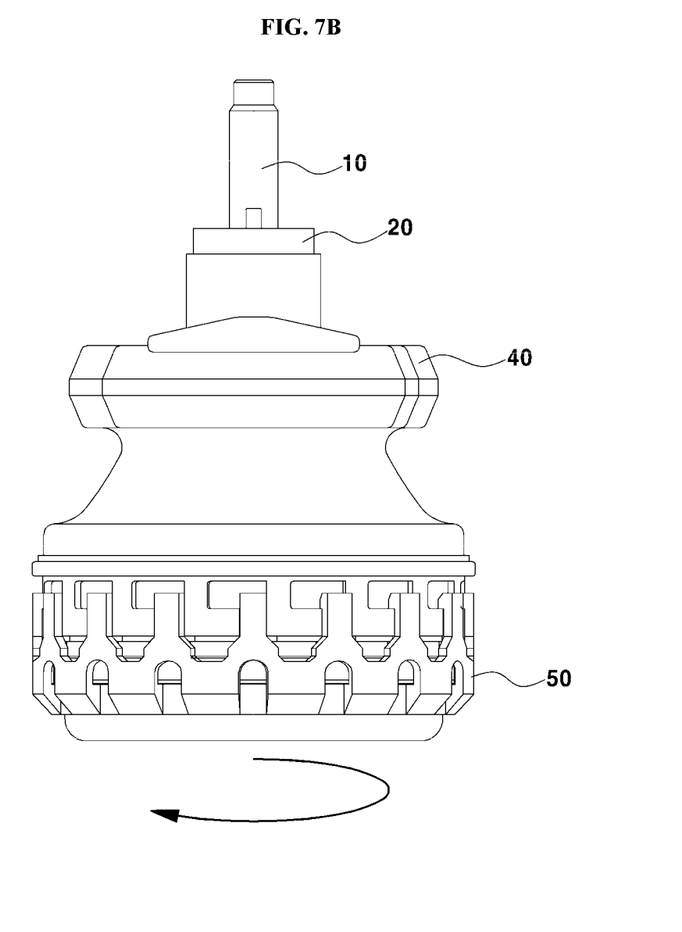
FIG. 7B is a view showing an assembly process of the hydro-mount according to various exemplary embodiments of the present invention.
Figure 7C:
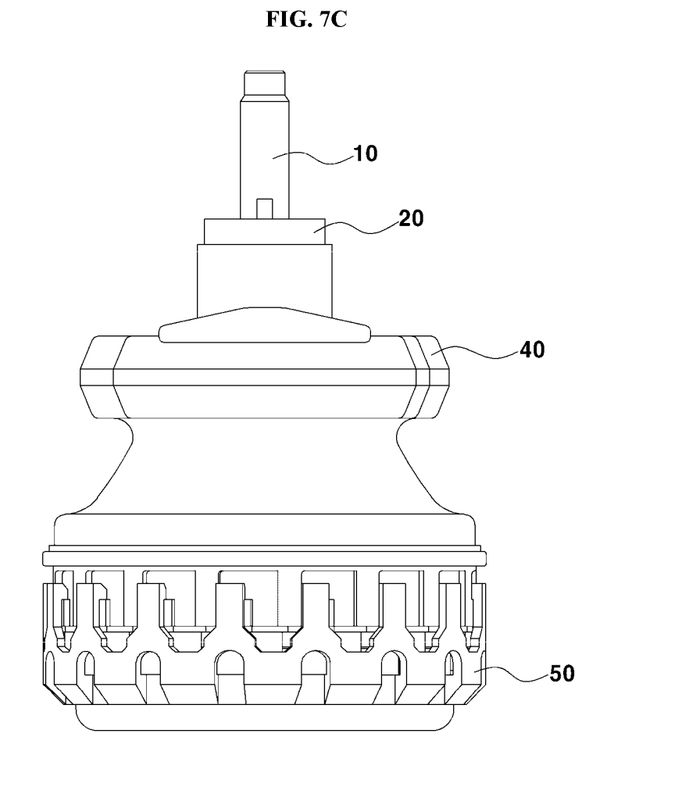
FIG. 7C is a view showing an assembled state of the hydro-mount according to various exemplary embodiments of the present invention.
Figure 7D:
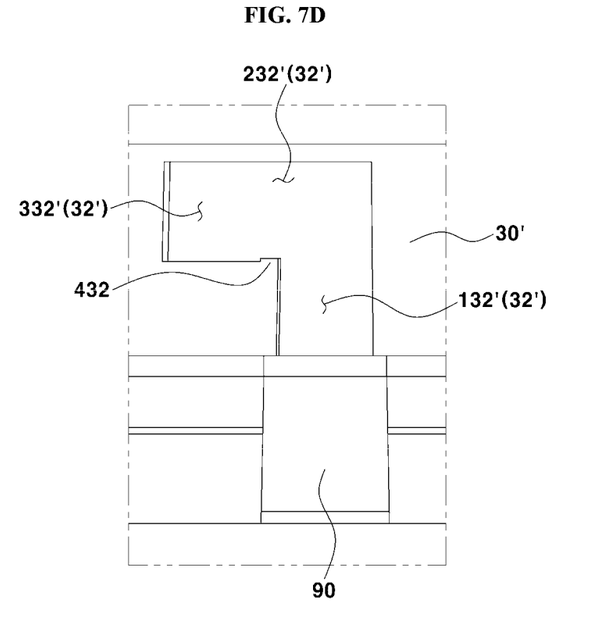
FIG. 7D is a partial enlarged view showing the fastening groove according to various exemplary embodiments of the present invention.
Figure 7E:
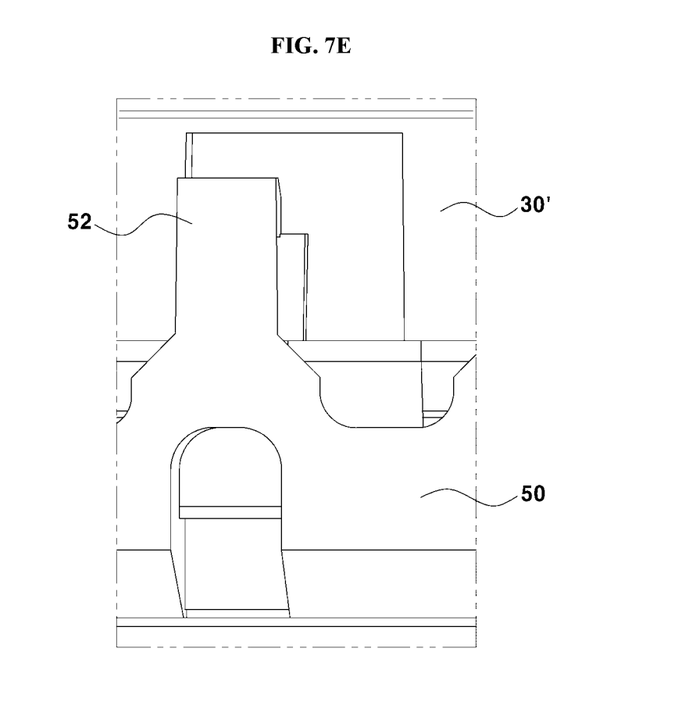
FIG. 7E is a view showing a completed state in which the locking portion is mounted to the fastening groove in FIG. 7D.

Referring to FIG. 6A, FIG. 6B, and FIG. 6C, when each of the locking portions 52 moving along the transfer route 132 reaches the turn route 232, the locking portion 52 meets the peg 432. When the locking portion 52 or the protrusion 152 reaches an end portion of the peg 432 with further upward force, the locking portion 52 moves to the seating portion 332 and is accommodated therein due to the twist elastic restoring force of the main rubber 40 and/or the diaphragm 80. Then the assembly is completed as the compressive force is removed.

The inclination portion 352 of the protrusion 152 allows the locking portions 52 to reach the seating portion 332 with a small twist elastic restoring force.

According to the exemplary embodiment of the present invention, the hydro-mount 1 has an assembly structure using an automatic rotation locking structure. The locking portion 52 of the locking body 50 is twisted while passing through the fastening groove 32. By the elastic restoring force due to twisting of the main rubber 40 and/or the diaphragm 80 to which the compressive force and the twisting are simultaneously applied, the twisting applied to the locking portion 52 is released so that the locking portions 52 reach the seating portion 332. Formed by rubber, the main rubber 40 and the diaphragm 80 acts as seals and is provided with compressive elastic force such that the locking body 50 is assembled to the body plate 30.

The hydro-mount according to various exemplary embodiments of the present invention has a structure configured for being assembled without elastic deformation of the locking body 50, which is different from the related art. Accordingly, there is no limitation on a material of the locking body. Under suitable cost and strength conditions, any material from a material with low elastic restoring force to a flexible material may be used as a material of the locking body 50. In other words, the present invention is competitive in terms of cost and/or weight.

Furthermore, it is possible to re-assemble the hydro-mount according to various exemplary embodiments of the present invention. Previously, re-assembly has been impossible due to damage to components during disassembly, but the hydro-mount according to various exemplary embodiments of the present invention is easy to be re-assembled and disassembled, allowing reuse of components. Accordingly, the components may be applied tunable.

The hydro-mount according to various exemplary embodiments of the present invention may be variously modified within the scope of the present invention.

As a non-limiting example, as shown in FIGS. 7A to 7E, according to some modifications of the present invention, the hydro-mount 1 may be configured to be assembled using only the guide of the locking body 50 without utilizing the twist elastic restoring force.

The locking body 50 applied with the compressive force moves in the axial direction Z. The locking portion 52 may move along each of the recess 90 and a transfer route 132' and finally be accommodated in a seating portion 332' of a fastening grooves 32'.

The locking body 50 is configured to be rotatable with respect to the axial direction Z during assembly. When the locking body 50 passes through the recess 90 and the transfer route 132' and reaches the turn route 232', the locking body 50 may be rotated and accommodated in the seating portion 332'.

In the modification, the transfer route 132' is formed substantially parallel to the axial direction Z of the hydro-mount 1 or the body plate 30. Furthermore, a peg 432 may be formed like a bump so that the locking portion 52 accommodated in the seating portion 332' is kept from being separated from the seating portion 332'.

Figure 8:
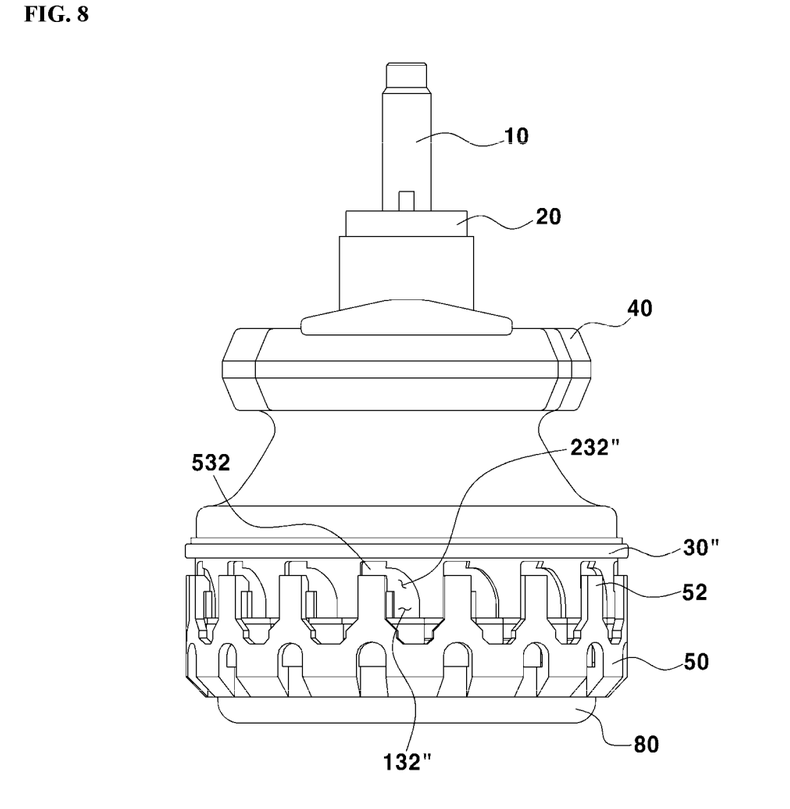
FIG. 8 is a view showing the hydro-mount according to various exemplary embodiments of the present invention.

As shown in FIG. 8, according to some modifications of the present invention, a body plate 30" may include a guide portion 532 expanding upward in the fastening groove 32. The guide portion 532 may expand upwards from a turn route 232".

The guide portion 532 may be provided to prevent an unstable assembly condition due to the twist elastic restoring force when the locking portion 52 that has passed through the turn route 232" is accommodated in the seating portion 332. The guide portion 532 may be formed at a portion facing a seating surface of the seating portion 332.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A hydro-mount comprising:
   a locking body including a plurality of locking portions;
   a body plate including a plurality of fastening grooves wherein the plurality of locking portions is configured to move along the plurality of fastening grooves, wherein a main rubber is mounted in the body plate; and
   a diaphragm stacked between the main rubber and the locking body,
   wherein each of the fastening grooves includes:
      a transfer route formed to be inclined from an axial direction of the body plate;
      a seating portion bent at a predetermined angle from the transfer route so that each of the locking portions is accommodated in a corresponding seating portion; and
      a turn route formed by bending the transfer route into a curved surface to connect the seating portion and the turn route.

2. The hydro-mount of claim 1, wherein the locking body and the body plate are coupled to each other by twisting of the locking portions and elastic restoring force of the main rubber, the diaphragm, or both of the main rubber and the diaphragm.

3. The hydro-mount of claim 1, wherein a nozzle assembly is stacked between the main rubber and the diaphragm.

4. The hydro-mount of claim 1, wherein the plurality of locking portions is disposed at a predetermined distance apart from each other along a circumferential direction of the locking body.

5. The hydro-mount of claim 1, wherein the plurality of fastening grooves is formed by depressing a surface of the body plate.

6. The hydro-mount of claim 1, wherein the plurality of fastening grooves is formed by cutting out the body plate.

7. The hydro-mount of claim 1, wherein the body plate includes a peg which is a bump formed between the transfer route and the seating portion.

8. The hydro-mount of claim 7, wherein the peg protrudes from the body plate toward the fastening grooves.

9. The hydro-mount of claim 7, wherein the peg includes a shape of a triangle, a rectangle, or a curved surface.

10. The hydro-mount of claim 7, wherein each of the locking portions includes an inclination portion protruding perpendicularly from a surface of the locking portion and inclined with respect to a circumferential direction of the locking body so that the locking portion is brought into contact with the peg based on the locking portion moving from the transfer route to the seating portion.

11. The hydro-mount of claim 10, wherein each of the locking portions further includes a flat portion extending from the inclination portion and protruding perpendicularly from the surface of the locking portion, and the flat portion is formed in a direction parallel to the circumferential direction of the locking body.

12. The hydro-mount of claim 1, wherein each of the locking portions includes a protrusion protruding from a surface of each of the locking portions to be inserted into each fastening groove.

13. The hydro-mount of claim 1, wherein each of the fastening grooves includes a guide portion recessed opposite to the seating portion on an opposite side of the seating portion.

14. The hydro-mount of claim 1, wherein each of the fastening grooves includes:
the transfer route formed in a direction parallel to a coupling direction between the locking body and the body plate; and
a seating portion bent at a predetermined angle from the transfer route to rest the locking portions.

15. A hydro-mount comprising:
a core;
a body plate disposed concentrically with the core radially outward and including a plurality of fastening grooves spaced from each other along a circumference of the body plate;
a main rubber inserted between the core and the body plate;
a locking body including a plurality of locking portions being engageable with the plurality of fastening grooves; and
a nozzle assembly and a diaphragm stacked between the main rubber and the locking body,
wherein the nozzle assembly and the diaphragm include a plurality of recesses formed on each outer surface of the nozzle assembly and the diaphragm and spaced a predetermined distance apart along circumferences of the nozzle assembly and the diaphragm such that the plurality of locking portions passes through the plurality of recesses.

16. The hydro-mount of claim 15, wherein, as the plurality of locking portions is coupled to the plurality of fastening grooves, the main rubber and the diaphragm are compressed and twisted, and
the locking body and the body plate are coupled to each other due to elastic restoring force of the main rubber, the diaphragm, or both of the main rubber and the diaphragm, caused by twisting.

17. The hydro-mount of claim 15, wherein each of the plurality of fastening grooves includes:
a transfer route formed to be inclined from an axial direction of the body plate; and
a seating portion bent at a predetermined angle from the transfer route so that each of the locking portions is accommodated in a corresponding seating portion.

18. The hydro-mount of claim 17, wherein the body plate includes a peg which is a bump formed between the transfer route and the seating portion.

19. A hydro-mount comprising:
a locking body including a plurality of locking portions;
a body plate including a plurality of fastening grooves, wherein the plurality of locking portions is configured to move along the plurality of fastening grooves, wherein a main rubber is mounted in the body plate; and
a diaphragm stacked between the main rubber and the locking body,
wherein each of the fastening grooves includes:
a transfer route formed to be inclined from an axial direction of the body plate; and
a seating portion bent at a predetermined angle from the transfer route so that each of the locking portions is accommodated in a corresponding seating portion,
wherein the body plate includes a peg which is a bump formed between the transfer route and the seating portion.

* * * * *